US010500599B2

(12) United States Patent
Utsumi et al.

(10) Patent No.: US 10,500,599 B2
(45) Date of Patent: Dec. 10, 2019

(54) THERMAL SPRAYING TORCH

(71) Applicant: NISSAN MOTOR CO., LTD., Kanagawa (JP)

(72) Inventors: Yoshito Utsumi, Kanagawa (JP); Satoru Sakurai, Kanagawa (JP); Yoshitsugu Noshi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/087,533

(22) PCT Filed: Mar. 23, 2016

(86) PCT No.: PCT/JP2016/059143

§ 371 (c)(1),
(2) Date: Sep. 21, 2018

(87) PCT Pub. No.: WO2017/163325

PCT Pub. Date: Sep. 28, 2017

(65) Prior Publication Data

US 2019/0099770 A1 Apr. 4, 2019

(51) Int. Cl.

*B23K 10/00* (2006.01)
*B05B 7/22* (2006.01)
*C23C 4/12* (2016.01)
*H05H 1/42* (2006.01)
*B05B 15/50* (2018.01)
*B05B 13/06* (2006.01)

(52) U.S. Cl.

CPC .............. *B05B 7/224* (2013.01); *B05B 15/50* (2018.02); *C23C 4/12* (2013.01); *H05H 1/42* (2013.01); *B05B 13/0636* (2013.01)

(58) Field of Classification Search

CPC ..... B05B 7/224; B05B 15/50; B05B 13/0636; C23C 4/12; H05B 1/42; H05B 1/34
USPC ... 219/121.47, 76.15, 76.16, 121.48, 121.52, 219/121.5
See application file for complete search history.

(56) References Cited

U.S. PATENT DOCUMENTS 6,093,903 A * 7/2000 Schneider ................ H05H 1/34 219/121.36
8,431,856 B2 4/2013 Kaeppeler et al.
(Continued)

FOREIGN PATENT DOCUMENTS

CN 104955582 A 9/2015
JP H07-135090 A 5/1995
(Continued)

*Primary Examiner* — Mark H Paschall
(74) *Attorney, Agent, or Firm* — Osha Liang LLP

(57) ABSTRACT

A thermal spraying torch configured to spray a molten material onto a thermal sprayed surface of a work object and form a thermal sprayed coating has a discharge port configured to discharge the molten material, a discharge port periphery located on a peripheral edge of the discharge port on a front side in a discharge direction of the molten material and extending in the discharge direction, and an external surface continuous with a front end of the discharge port periphery. The discharge port periphery includes first section to which the molten material adheres more easily than to the external surface. The external surface includes a second section to which the molten material adheres less easily than to the discharge port periphery.

14 Claims, 5 Drawing Sheets

(56) References Cited

U.S. PATENT DOCUMENTS

| | | | | |
|---|---|---|---|---|
| 9,269,544 | B2 * | 2/2016 | Koo | H05H 1/2406 |
| 10,060,020 | B2 * | 8/2018 | Verpoort | B05B 7/224 |
| 10,124,354 | B2 * | 11/2018 | Verpoort | B05B 7/224 |
| 2009/0057277 | A1 * | 3/2009 | Renault | H05H 1/34<br>219/121.5 |
| 2010/0320175 | A1 | 12/2010 | Kaeppeler et al. | |
| 2012/0018407 | A1 * | 1/2012 | Schramm | B05B 7/224<br>219/76.16 |
| 2015/0329953 | A1 | 11/2015 | Molz et al. | |
| 2016/0001309 | A1 | 1/2016 | Verpoort et al. | |

FOREIGN PATENT DOCUMENTS

| | | | |
|---|---|---|---|
| JP | 2010-110669 | A | 5/2010 |
| JP | 5370693 | B2 | 12/2013 |
| JP | 2015-183215 | A | 10/2015 |
| WO | 2014/120358 | A1 | 8/2014 |

* cited by examiner

THERMAL SPRAYING TORCH

BACKGROUND

Technical Field

The present invention relates to a thermal spraying torch which sprays a molten material onto a thermal sprayed surface of a work to form a thermal sprayed coating.

Related Art

There is known a thermal spraying technique in which a molten material including a metal, a ceramic, or the like is thermally sprayed onto an inner surface of a cylinder bore of a cylinder block in an automotive engine or the like to form a thermal sprayed coating (see Patent Literature 1 below).

Patent Literature

Patent Literature 1: Japanese Patent No. 5370693

SUMMARY OF INVENTION

In the formation of the thermal sprayed coating, a thermal spraying torch is inserted into the cylinder bore and discharges molten particles, obtained by melting the thermal spraying material, as thermal spraying flame while being rotated and moved in an axial direction. In this case, some of the molten particles (primary particles) just discharged from the thermal spraying torch and some of the molten particles (secondary particles) flying to the inner surface of the cylinder bore but failing to adhere thereto and bouncing back adhere to the thermal spraying torch and deposit as coating deposits. The coating deposits depositing on the thermal spraying torch separate therefrom during the thermal spraying work and are mixed into the newly-discharged thermal spraying flame to adhere to the inner surface of the cylinder bore. This leads to a decrease in quality of the thermal sprayed coating.

One or more embodiments of the present invention may suppress a decrease in quality of a thermal sprayed coating caused by mixing of a coating deposit.

In the thermal spraying torch according to one or more embodiments of the present invention, a discharge port periphery includes a section to which a molten material adheres more easily, and an external surface includes a section to which the molten material adheres less easily than to the discharge port periphery.

Since the amount of heat in the molten material (primary particles) just discharged from the discharge port of the thermal spraying torch is high, the molten material easily adheres to the thermal spraying torch. Since the primary particles naturally having high adhesion strength adhere to the discharge port periphery including the section to which the molten material adheres more easily, the separation of coating deposits formed by the primary particles adhering to the discharge port periphery can be more surely suppressed.

Meanwhile, the amount of heat in the molten material (secondary particles) discharged from the discharge port of the thermal spraying torch but then failing to adhere to the thermal sprayed surface and bouncing back is small and the adhesion strength of the molten material is low. Thus, such a molten material tends to peel off from the thermal spraying torch even if it adheres thereto. Since the external surface includes the section to which the molten material adheres less easily, it is possible to more surely suppress adhesion of the secondary particles, naturally having low adhesion strength, to the external surface in the section to which the molten material adheres less easily. The generation of coating deposits by the secondary particles is thereby suppressed on the external surface, and the separation of the coating deposits from the external surface can be more surely suppressed.

Suppressing the separation of the coating deposits from the discharge port periphery and the external surface as described above can suppress a decrease in quality of the thermal sprayed coating caused by mixing of the coating deposits.

DETAILED DESCRIPTION

Figure 1:
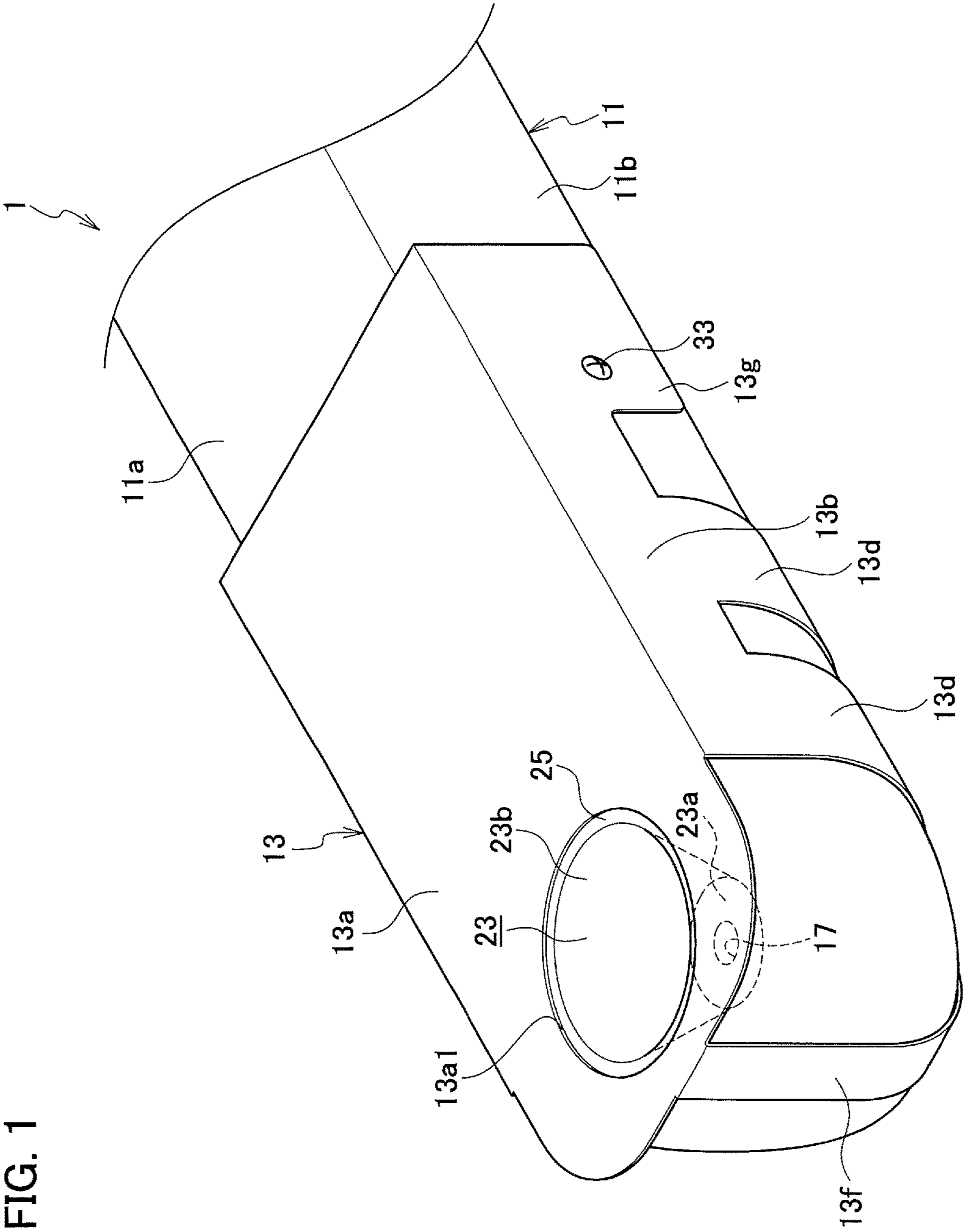
FIG. 1 is a perspective view of a thermal spraying torch according to one or more embodiments of the present invention.
Figure 2:
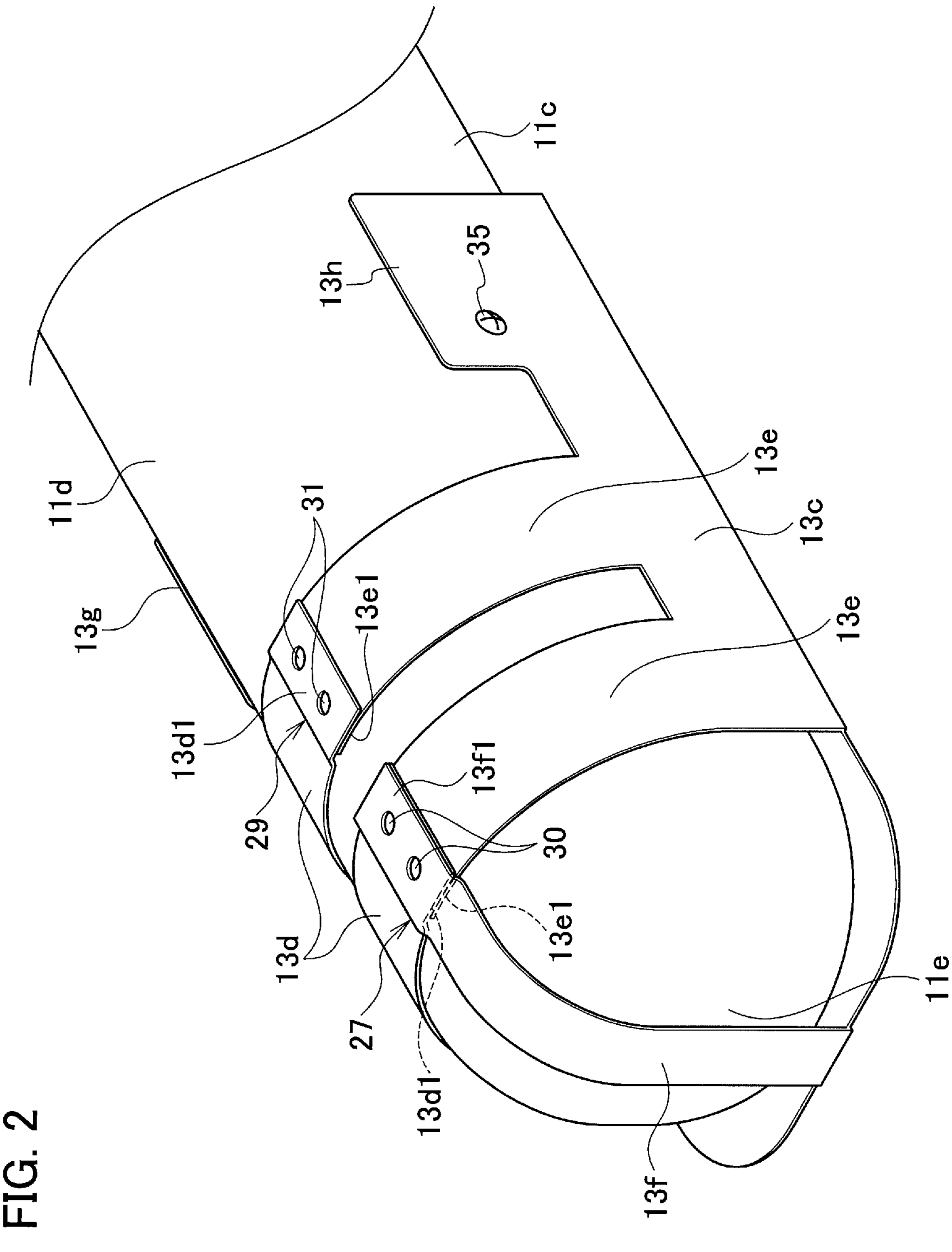
FIG. 2 is a perspective view of the thermal spraying torch as viewed from the back side thereof.

Embodiments of the present invention are described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A thermal spraying torch 1 illustrated in FIGS. 1 to 4 is included in a thermal spraying apparatus which sprays thermal sprayed particles 7 being a molten material onto an inner surface 5*a* of a cylinder bore 5 in a cylinder block 3 (see FIG. 4) of an automotive engine or the like to form a thermal sprayed coating 9. Here, the cylinder block 3 is a work object, the cylinder bore 5 is a circular hole, and the inner surface 5*a* of the cylinder bore 5 is a thermal sprayed surface.

The thermal spraying torch 1 is rotated and moved in an axial direction while being inserted in the cylinder bore 5 to form the thermal sprayed coating 9 over substantially the entire inner surface 5*a*. After the formation of the thermal sprayed coating 9, the thermal sprayed coating 9 is honed to smooth a surface of the thermal sprayed coating 9 and this surface is thereby formed into a sliding surface for a piston ring.

Figure 3:
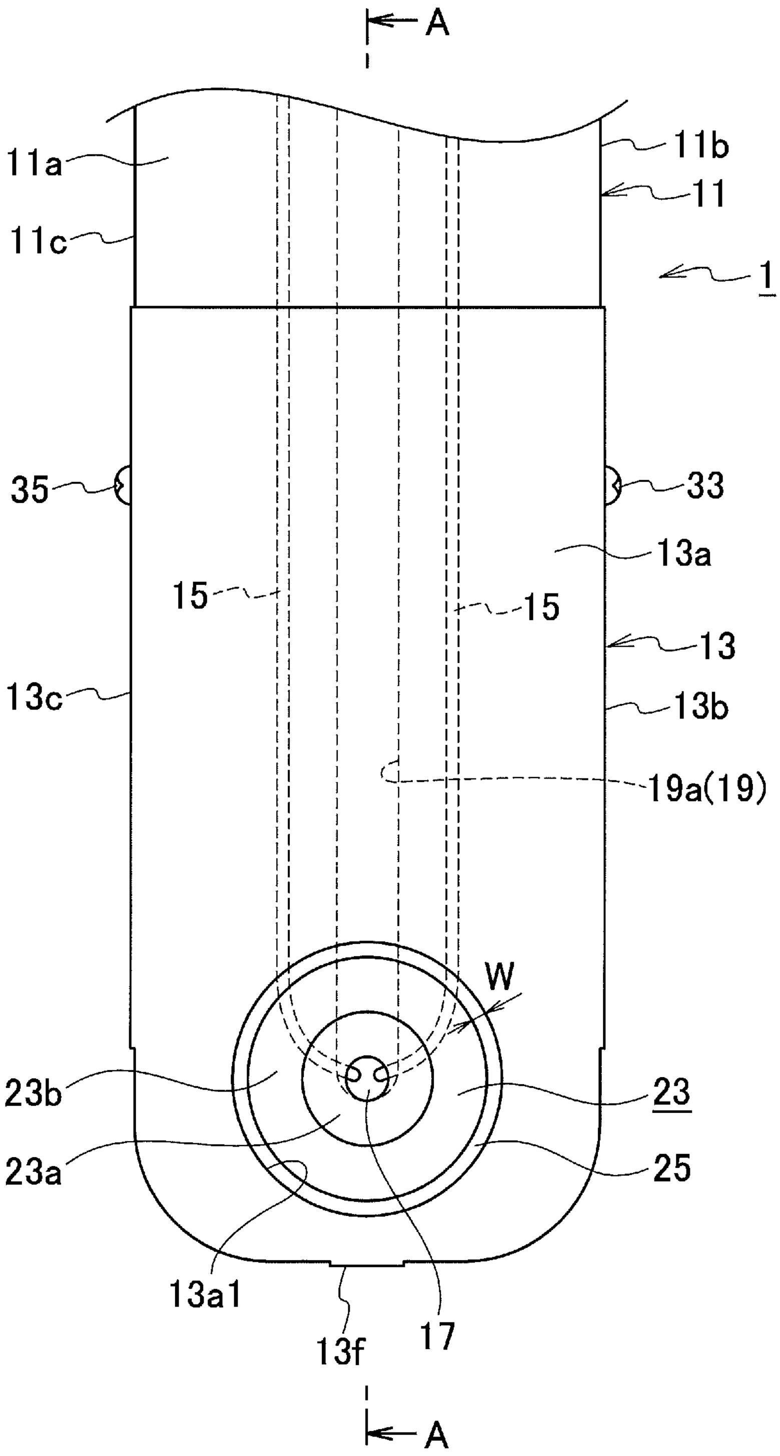
FIG. 3 is a front view of the thermal spraying torch.

The thermal spraying torch 1 includes a torch main body 11 made of iron. A cover 13 made of copper and covering the torch main body 11 is detachably attached to the torch main body 11. In the torch main body 11, thermal spraying wires 15 being a thermal spraying material are sent out little by little toward a discharge port 17 by a not-illustrated send-out mechanism. The thermal spraying wires 15 are made of an iron-based material and, as illustrated in FIG. 3, two thermal spraying wires 15 are arranged parallel to each other on the left and right sides. Front ends of the two thermal spraying wires 15 protrude into the discharge port 17 and are located close to each other. The two thermal spraying wires 15 are movably inserted in wire insertion holes formed in the torch main body 11 and are electrically insulated from the wire insertion holes.

One of the thermal spraying wires 15 is set as a positive (+) electrode while the other thermal spraying wire 15 is set as the negative (−) electrode, and voltage is applied between the electrodes of the thermal spraying wires 15. Then, a discharge arc is generated between the electrodes near an intersection of extensions of the two thermal spraying wires 15 in send-out directions thereof, and the two thermal spraying wires 15 are melted by thermal energy of the discharge arc. Note that electrodes for applying voltage to the thermal spraying wires 15 are omitted.

Figure 4:
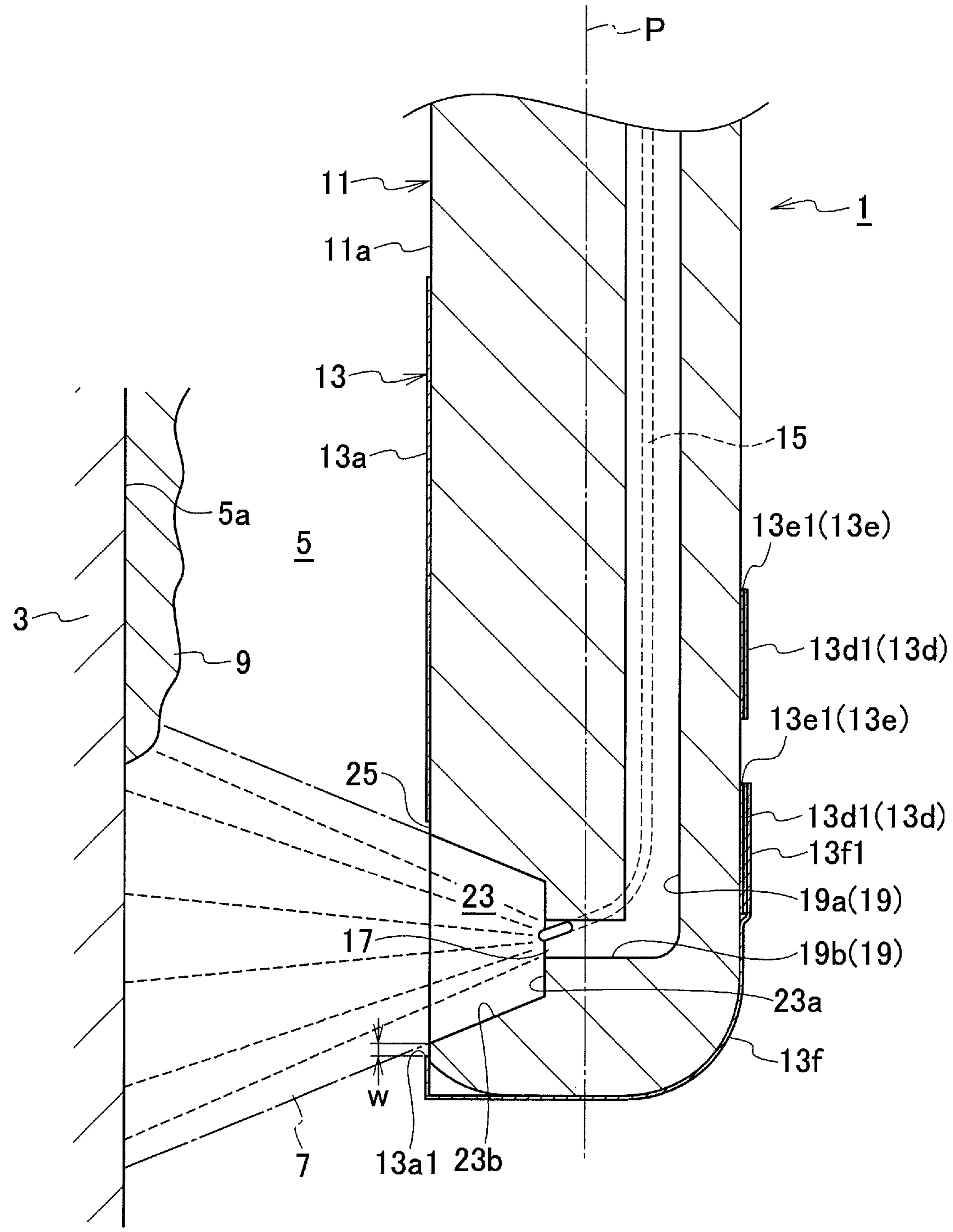
FIG. 4 is a cross-sectional view along the A-A line in FIG. 3 including a state where a thermal sprayed coating is formed on an inner surface of a cylinder bore.

The torch main body 11 of the thermal spraying torch 1 includes therein a gas flow passage 19 communicating with the discharge port 17. As illustrated in FIG. 3, the gas flow passage 19 is arranged between the two thermal spraying wires 15 on the left and right sides. As illustrated in FIG. 4, the gas flow passage 19 includes an upstream portion 19*a* which is parallel to a rotation center axis P of the thermal spraying torch 1 and a downstream portion 19*b* which communicates with a lower end of the upstream portion 19*a* and whose front end communicates with the discharge port 17. A gas flowing through the gas flow passage 19 causes the molten material obtained by melting the thermal spraying wires 15 to be discharged forward from the discharge port 17 as the thermal sprayed particles 7.

A substantially-conical recess portion 23 is formed in front of the discharge port 17 in a discharge direction thereof in the torch main body 11, and the discharge port 17 is opened in the recess portion 23. The recess portion 23 includes a bottom wall 23*a* in which the discharge port 17 is opened in a center portion and an annular side wall 23*b* which is located on a peripheral edge of the discharge port 17 on a front side in the discharge direction thereof and formed to extend in the discharge direction of the thermal sprayed particles 7. The annular side wall 23*b* has a tapered shape wider on the front side in the discharge direction of the discharge port 17. Specifically, the annular side wall 23*b* has such a tapered shape that the diameter thereof on the bottom wall 23*a* side is smaller than the diameter thereof on the opening side of the recess portion 23.

The torch main body 11 includes a planar front face 11*a* on the side provided with the recess portion 23, side faces 11*b*, 11*c* continuously extending from left and right sides of the front face 11*a* in FIG. 3 to the back side in curved shapes, a curved rear face 11*d* located on the back side of the front face 11*a* and being continuous with the side faces 11*b*, 11*c*, and a planar distal end face 11*e*. The rear face 11*d* continuously connects end edges of the side faces 11*b*, 11*c* on the opposite side to the front face 11*a* to each other. The distal end face 11*e* is continuous with the front face 11*a*, the side faces 11*b*, 11*c*, and the rear face 11*d* in curved surfaces.

The cover 13 includes a planar cover front face 13*a* covering the front face 11*a* of the torch main body 11 and planar cover side faces 13*b*, 13*c* bent from left and right sides of the cover front face 13*a* in FIG. 3 toward the back side. The cover front face 13*a* is provided with a circular opening 13*a*1 opened such that the recess portion 23 is exposed to the outside. The diameter of the circular opening 13*a*1 is larger than the diameter of a circular opening side end of the recess portion 23. Accordingly, an annular front face exposed portion 25 is formed in the opening side end of the recess portion 23. The width dimension W of the front face exposed portion 25 is uniform over the entire circumference and is, for example, about 1 mm.

Two band pieces 13*d* extend from an end edge of the cover side face 13*b* on the opposite side to the cover front face 13*a* to be wrapped on the rear face 11*d* of the torch main body 11. Moreover, two band pieces 13*e* extend from an end edge of the cover side face 13*c* on the opposite side to the cover front face 13*a* be wrapped on the rear face 11*d* of the torch main body 11. Furthermore, one distal end band piece 13*f* extends from an end edge of the cover front face 13*a* on a distal end side, in a direction orthogonal to the band pieces 13*d*, 13*e*, be wrapped on the distal end face 11*e* and the rear face 11*d*.

The band pieces 13*d*, 13*e* are curved to be wrapped on the rear face 11*d* of the torch main body 11 which has a protruding curved shape, and end portions 13*d*1, 13*e*1 of the band pieces 13*d*, 13*e* are located substantially at the center of the rear face 11*d*. The end portions 13*d*1, 13*e*1 are made to overlap one another to form a distal end side overlapping portion 27 and a base end side overlapping portion 29. In the distal end side overlapping portion 27, an end portion 13*f*1 of the distal end band piece 13*f* is made to overlap the end portion 13*d*1 of the band piece 13*d* on the distal end side.

In the distal end side overlapping portion 27, three band pieces including the band pieces 13*d*, 13*e* and the distal end band piece 13*f* are fixed together in an overlapping state by using fixtures 30. Meanwhile, in the base end side overlapping portion 29, two band pieces including the band pieces 13*d*, 13*e* are fixed together in an overlapping state by using fixtures 31.

The cover 13 includes attachment pieces 13*g*, 13*h* extending in the same direction as the band pieces 13*d*, 13*e*, on the base end side of the cover side faces 13*b*, 13*c* which is the opposite side to the distal end band piece 13*f*. The attachment pieces 13*g*, 13*h* are fixed to the side faces 11*b*, 11*c* of the torch main body 11 by using screws 33, 35.

In the cover 13, band portions are formed by using the fixtures 30, 31 before attachment to the torch main body 11, and a space for inserting the torch main body 11 is formed. The torch main body 11 is inserted into the space in the cover 13 in this state, and then the screws 33, 35 are fastened to attach the cover 13 to the torch main body 11.

As described above, in the thermal spraying torch 1, the torch main body 11 is made of iron and the cover 13 is made of copper. A surface of the annular side wall 23*b* and a surface of the annular front face exposed portion 25 in the torch main body 11 made of iron are subjected to, for example, shot blasting to increase the surface roughness and form fine recesses and protrusions. A specific surface roughness of the side wall 23*b* and the front face exposed portion 25 is such that Ra (arithmetic average roughness) is 0.1 to 6 μm and Rz (ten-point average roughness) is 0.5 to 50 μm.

Meanwhile, a surface of the cover 13 made of copper, particularly a surface of the cover front face 13*a* is subjected to, for example, polishing to reduce the surface roughness and form an almost mirror surface which is smooth. A specific surface roughness of the cover 13 is such that Ra (arithmetic average roughness) is 0.09 μm or less and Rz (ten-point average roughness) is 0.9 μm or less.

Specifically, the surface roughness of the surfaces of the annular side wall 23*b* and the front face exposed portion 25 in the torch main body 11 is different from the surface roughness of the surface of the cover 13 made of copper, and the former surface roughness is higher than the latter surface roughness. In other words, the latter surface roughness is lower than the former surface roughness. This means that the thermal sprayed particles 7 adhere more easily to the surfaces of the annular side wall 23*b* and the front face exposed portion 25 in the torch main body 11 than to the surface of the cover 13. In other words, the thermal sprayed particles 7 adhere less easily to the surface of the cover 13 than to the surfaces of the annular side wall 23*b* and the front face exposed portion 25 in the torch main body 11. Specifically, the side wall 23*b* includes a section to which the thermal sprayed particles 7 adhere more easily than to the cover front face 13*a*, and the cover front face 13*a* includes a section to which the thermal sprayed particles 7 adhere less easily than to the side wall 23*b*.

The aforementioned side wall 23*b* forms a discharge port periphery, and the cover front face 13*a* and the front face exposed portion 25 form an external surface continuous with a front end of the discharge port periphery. In this case, an end portion (front face exposed portion 25) of the external surface on the side continuous with the discharge port periphery (side wall 23*b*) is formed on a surface to which the molten material adheres more easily than to the section (cover front face 13*a*) of the external surface to which the molten material adheres less easily.

In the side wall 23*b* and the front face exposed portion 25 with such a surface property that the thermal sprayed particles 7 adhere more easily, droplets of the thermal sprayed particles 7 intrude into the protrusions and recesses of the rough surface and high interfacial adhesion strength is generated. Meanwhile, in the smooth surface of the cover 13 with such a surface property that the thermal sprayed particles 7 adhere less easily, the droplets of the thermal sprayed particles 7 are less likely to intrude and the adhesion strength is thus smaller.

Next, operations are described.

Figure 5:
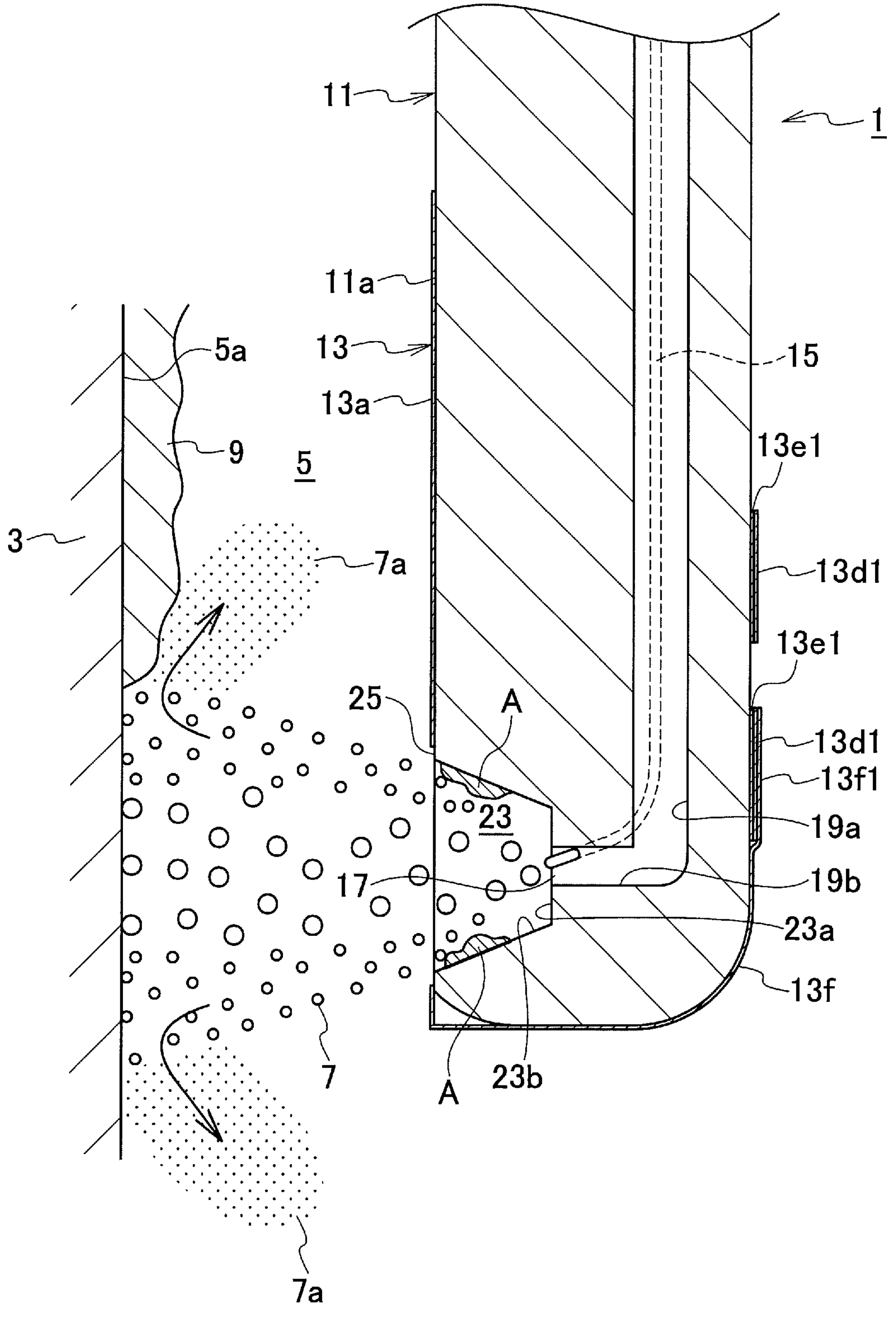
FIG. 5 is an operation explanatory view illustrating how thermal sprayed particles discharged from the thermal spraying torch fly.

As illustrated in FIG. 5, the thermal sprayed particles (primary particles) 7 discharged from the discharge port 17 of the thermal spraying torch 1 fly forward while spreading along the side wall 23*b* of the recess portion 23 and reach the inner surface 5*a* of the cylinder bore 5. In this case, some of the thermal sprayed particles 7 flying along the side wall 23*b* adhere to the side wall 23*b* and become coating deposits A.

Since the side wall 23*b* is made of the iron-based material like the thermal sprayed particles 7, that is a material with high affinity for the thermal sprayed particles 7 and is formed to have the rough surface with the fine protrusions and recesses, the thermal sprayed particles 7 adhere more easily thereto. Moreover, since the amount of heat (energy) in the thermal sprayed particles 7 (primary particles) just discharged from the discharge port 17 of the thermal spraying torch 1 is large, the adhesion strength of the thermal sprayed particles 7 is high. Accordingly, the coating deposits A formed by the primary particles adhering to the side wall 23*b* are highly unlikely to separate from the side wall 23*b*.

Most of the thermal sprayed particles 7 reaching the inner surface 5*a* of the cylinder bore 5 adhere to the inner surface 5*a* and form the thermal sprayed coating 9. The thermal sprayed particles 7 reaching the inner surface 5*a* but failing to adhere thereto bounce back and become secondary particles 7*a*, and some of the secondary particles 7*a* fly toward the thermal spraying torch 1.

In this case, adhesion of the thermal sprayed particles 7 (secondary particles 7*a*) to the cover 13 is suppressed because the cover 13 in the thermal spraying torch 1 is made of copper which is a material with low affinity for the thermal sprayed particles 7 and the surface of the cover 13 including the cover front face 13*a* is formed to be an almost mirror surface by polishing and has such a surface property that the thermal sprayed particles 7 adhere less easily thereto.

The aforementioned secondary particles 7*a* have smaller particle size, are more likely to be cooled by an outside air to a lower temperature, and fly at a lower speed than the thermal sprayed particles 7 discharged from the discharge port 17 but not reaching the inner surface 5*a* yet. Accordingly, the energy of the secondary particles 7*a* upon hitting a target object is low and the adhesion strength thereof is thus low. Hence, adhesion of the thermal sprayed particles 7 (secondary particles 7*a*) to the cover 13 is further suppressed.

Moreover, the secondary particles 7*a* include poor-quality particles bouncing off the inner surface 5*a*, the poor-quality particles being particles located at an outer end among the thermal sprayed particles 7 sprayed onto the inner surface 5*a* while radially spreading from the discharge port 17. The poor-quality particles have smaller particle size, are more likely to be cooled by an outside air to a lower temperature, and fly at a lower speed than good-quality particles in the center. The secondary particles 7*a* mainly generated by bouncing back of such poor-quality particles are highly unlikely to adhere to the cover 13.

As described above, since the primary particles naturally having high adhesion strength adhere to the side wall 23*b* and the front face exposed portion 25 to which the particles adhere more easily, separation of the coating deposits A formed by the primary particles adhering to the side wall 23*b* and the front face exposed portion 25 can be more surely suppressed.

Meanwhile, the amount of heat (energy) in the thermal sprayed particles 7 (secondary particles 7*a*) discharged from the discharge port 17 of the thermal spraying torch 1 but then failing to adhere to the inner surface 5*a* of the cylinder bore 5 and bouncing back is small and the adhesion strength thereof is low. Thus, the secondary particles 7*a* tend to peel off from the thermal spraying torch 1 (cover 13) even if they adhere thereto. Accordingly, the adhesion of the secondary particles 7*a*, naturally having low adhesion strength, to the cover 13 is more surely suppressed by making the surface of the cover 13, being a section to which the secondary particles 7*a* adhere, to have such a surface property that the thermal sprayed particles 7 adhere less easily. The coating deposits are thus less likely to be generated by the secondary particles 7*a* on the surface of the cover 13 and the separation of the coating deposits can be more surely suppressed.

Suppressing the separation of the coating deposits from the torch main body 11 and the cover 13 as described above can suppress mixing of the coating deposits into the thermal sprayed coating 9 and suppress a quality decrease caused by the mixing of the coating deposits into the thermal sprayed coating 9. As a result, in honing which is a step subsequent to the thermal spraying work, it is possible to suppress separation of the coating deposits which occur when the coating deposits are mixed into the thermal sprayed coating 9 and suppress generation of voids in the sliding surface.

In one or more embodiments of the present invention, the surface roughness of the side wall 23*b* and the front face exposed portion 25 to which the molten material adhere more easily is higher than that of the cover front face 13*a*. In other words, the cover front face 13*a* of the cover 13 to which the molten material adheres less easily has lower surface roughness than the side wall 23*b* and the front face exposed portion 25.

Accordingly, the thermal sprayed particles 7 just discharged from the discharge port 17 more surely adhere to the side wall 23*b* and the front face exposed portion 25 in the torch main body 11 and become the coating deposits A which are less likely to separate. Meanwhile, the thermal sprayed particles 7 (secondary particles 7*a*) adhere less easily to the surface of the cover 13, and the separation of the coating deposits from the cover 13 can be more surely suppressed.

In one or more embodiment of the present invention, the side wall 23*b* and the front face exposed portion 25 to which the molten material adheres more easily is made of iron which is a material with lower thermal conductivity than the cover 13 made of copper. In other words, the cover front face 13*a* of the cover 13 to which the molten material adheres less easily is made of copper which is a material with higher thermal conductivity than the side wall 23*b* and the front face exposed portion 25 made of iron.

The amount of heat in the thermal sprayed particles 7 just discharged from the discharge port 17 is large. When the thermal sprayed particles 7 with such large amount of heat adhere to the side wall 23*b* and the front face exposed portion 25 made of the material with lower thermal conductivity, heat release is suppressed and the thermal sprayed particles 7 can keep holding a larger amount of heat. The thermal sprayed particles 7 holding a larger amount of heat have higher adhesion strength and are far less likely to separate from the side wall 23*b* and the front face exposed portion 25.

Moreover, if the secondary particles 7*a* adhere to the cover front face 13*a*, the heat held by the secondary particles 7*a* tends to be released to the cover 13 because the cover 13 is made of copper with higher thermal conductivity. The amount of heat in the secondary particles 7*a* which is naturally small thus becomes even smaller and, even if the secondary particles 7*a* adherers to the cover 13, the secondary particles 7*a* fall off before forming the coating deposits and the separation of the coating deposits can be suppressed.

In one or more embodiment of the present invention, the cover front face 13*a* of the cover 13 to which the molten material adheres less easily is made of copper which has lower affinity for the thermal sprayed particles 7 than the side wall 23*b* and the front face exposed portion 25 made of iron. In other words, the side wall 23*b* and the front face exposed portion 25 to which the molten material adheres more easily is made of iron which has higher affinity for the molten material than the cover 13 made of copper.

Making the torch main body 11 including the side wall 23*b* and the front face exposed portion 25 out of iron with higher affinity for the molten material can further improve the adhesion strength of the thermal sprayed particles 7 to the side wall 23*b* and the front face exposed portion 25. Meanwhile, making the cover 13 including the cover front face 13*a* out of copper with lower affinity for the molten material can further suppress adhesion of the secondary particles 7*a* to the cover 13 including the cover front face 13*a*.

In one or more embodiment of the present invention, in the external surface of the thermal spraying torch 1, the front face exposed portion 25 corresponding to an end portion of the external surface on the side continuous with the side wall 23*b* is formed on a surface to which the molten material adheres more easily than to the cover front face 13*a* of the external surface to which the molten material adheres less easily. In this case, there is no section to which the molten material adheres less easily, on a flying path of the thermal sprayed particles 7 in the recess portion 23 which are just discharged from the discharge port 17.

The thermal sprayed particles 7 discharged from the discharge port 17 generate a small vortex flowing toward the cover front face 13*a* around an opening periphery of the recess portion 23. Since the annular front face exposed portion 25 which is part of the torch main body 11 made of iron is provided near an area where the vortex is generated, the vortex can be prevented from reaching the cover 13. Since the front face exposed portion 25 has the same surface property as the side wall 23*b*, the thermal sprayed particles 7 which form the aforementioned vortex tend to adhere to the front face exposed portion 25 upon reaching it and, even if the thermal sprayed particles 7 form the coating deposits, the separation of the coating deposits can be suppressed because the adhesion strength thereof is high.

In one or more embodiment of the present invention, the discharge port periphery includes the side wall 23*b* of a section being the recess portion 23 in the external surface, and the side wall 23*b* has the tapered shape wider on the front side in the discharge direction of the discharge port 17. In this case, the coating deposits formed to extend continuously over the side wall 23*b* and the front face exposed portion 25 are less likely to separate because a bent angle formed between the side wall 23*b* and the front face exposed portion 25 is an obtuse angle larger than the bent angle in the case where the side wall 23*b* has a cylindrical shape.

In one or more embodiment of the present invention, the thermal spraying torch 1 includes the torch main body 11 and the cover 13 which cover the torch main body 11 and which is detachably attached to the torch main body 11, and the section of the external surface to which the molten material adheres less easily is provided in the cover 13. In this case, the section to which the molten material adheres less easily can be formed as a member separate from the torch main body 11, and the section to which the molten material adheres less easily and the section to which the molten material adheres more easily can be easily formed.

The aforementioned cover 13 can be easily removed from the torch main body 11 by removing the screws 33, 35. This facilitates cleaning work even if the molten material is left adhering to the surface of the cover 13. Moreover, since the cover 13 particularly covers the front face 11*a* of the torch main body 11, the cover 13 can prevent the torch main body 11 from coming into direct contact with the high-temperature molten material and protect the torch main body 11 from heat.

In the cover 13, portions around the attachment pieces 13*g*, 13*h* are fastened and fixed to the torch main body 11 by using the two screws 33, 35. In other portions, the band portions including the band pieces 13*d*, 13*e*, 13*f* are wrapped on the torch main body 11. In this case, the portions around the two screws 33, 35 are the only portions where the cover 13 is firmly in contact with the torch main body 11. Accordingly, even if the cover 13 is heated to a high temperature by, for example, coming into direct contact with the molten material, heat is transmitted from the cover 13 to the torch main body 11 little by little and the torch main body 11 can be prevented from being heated to a high temperature.

In one or more embodiment of the present invention, the thermal spraying torch 1 discharges the thermal sprayed particles 7 from the discharge port 17 while being rotated in the state inserted in the cylinder bore 5 which is the circular hole, and the section of the external surface to which the molten material adheres less easily is provided at least in a rear portion of the thermal spraying torch 1 in the rotating direction thereof.

Since the thermal spraying torch 1 discharges the thermal sprayed particles 7 from the discharge port 17 while being rotated, the molten material which fails to adhere to the inner surface 5*a* such as the secondary particles 7*a* bouncing off the inner surface 5*a* of the cylinder bore 5 is present more in the rear portion in the rotating direction of the thermal spraying torch 1. Accordingly, adhesion of the secondary particles 7*a* to the cover front face 13*a* can be more surely suppressed by providing the cover front face 13*a* at least in the rear portion of the thermal spraying torch 1 in the rotating direction thereof.

Although embodiments of the present invention have been described above, the embodiments are merely examples described to facilitate the understanding of the present invention, and the present invention is not limited by the embodiments. The technical scope of the present invention is not limited to the specific technical matters disclosed in the aforementioned embodiments and also includes various modifications, changes, alternative techniques, and the like which can be easily derived therefrom.

For example, although the case where the thermal sprayed coating 9 is formed on the inner surface 5*a* of the cylinder bore 5 is described in one or more of the aforementioned embodiments, the present invention can be applied to the case where the thermal sprayed coating is formed on thermal sprayed surfaces other than the inner surface 5*a* of the cylinder bore 5.

Although iron is used for the torch main body 11 as the material having low thermal conductivity or high affinity for the molten material to make the molten material adhere more easily in one or more of the aforementioned embodiments, the material of the torch main body 11 is not limited to iron. Moreover, although copper is used for the cover 13 as the material having high thermal conductivity or low affinity for the molten material to make the molten material adhere less easily, the material of the cover 13 is not limited to copper. For example, a ceramic or DLC (diamond-like carbon) may be used. In other words, the surfaces of the torch main body 11 and the cover 13 may be any surfaces as long as the molten material adheres more easily to the surface of the torch main body 11 than to the surface of the cover 13 and adheres less easily to the surface of the cover 13 than to the surface of the torch main body 11.

Although the side wall 23*b* and the front face exposed portion 25 of the torch main body 11 are subjected to shot blast surface treatment to make the molten material adhere more easily in one or more of the aforementioned embodiments, protrusions and recesses may be formed by machining or sanding to form a rougher surface.

Although the cover front face 13*a* of the cover 13 is polished and mirror-finished to make the molten material adhere less easily in one or more of the aforementioned embodiments, the cover front face 13*a* may be mirror-finished by using other methods such as a chemical method.

The aforementioned cover 13 may be configured to include only the cover front face 13*a* and cover only the front face 11*a* of the torch main body 11. In this case, the cover front face 13*a* is attached to the torch main body 11 by, for example, screws. Since the molten material which fails to adhere to the inner surface 5*a* of the cylinder bore 5 mainly moves toward the front face 11*a* of the torch main body 11, a sufficient effect can be obtained also when only the section corresponding to the front face 11*a* is set as the section to which the molten material adheres less easily.

Although the cover 13 is provided as a member separate from the torch main body 11 in one or more of the aforementioned embodiments, the cover 13 may not be used. In this configuration, the surface of the front face 11*a* of the torch main body 11 is smoothed by polishing or the like and mirror-finished. The surface of the front face 11*a* of the torch main body 11 is thereby made to have such a surface property that the molten material adheres less easily than to the surfaces of the side wall 23*b* and the front face exposed portion 25.

In one or more of the aforementioned embodiments, a step is formed between the surface of the cover front face 13*a* and the surface of the front face exposed portion 25 in the torch main body 11 by attaching the cover 13 to the torch main body 11. Alternatively, the configuration may be such that an annular protrusion is provided in the opening side periphery of the recess portion 23 in the torch main body 11 and the cover 13 is attached to the torch main body 11 by inserting the annular protrusion into the circular opening 13*a*1 of the cover 13.

In this configuration, a front end surface of the annular protrusion corresponds to the front face exposed portion 25 and the front end surface of the protrusion (front face exposed portion 25) and the surface of the cover front face 13*a* can be made substantially flush by setting the protruding height of the annular protrusion substantially the same as the plate thickness of the cover 13. When the aforementioned annular protrusion is provided, the protrusion functions as a positioning member in the configuration where the aforementioned cover 13 includes only the cover front face 13*a*, and workability of attaching the cover 13 to the torch main body 11 is improved.

One or more embodiments of the present invention may be applied to a thermal spraying torch which sprays a molten material onto a thermal sprayed surface of a work object to form a thermal sprayed coating.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 thermal spraying torch
3 cylinder block (work object)
5 cylinder bore (circular hole)
5*a* inner surface (thermal sprayed surface) of cylinder bore
7 thermal sprayed particles (molten material)
11 torch main body
13 cover
13*a* cover front face (external surface)
17 discharge port of thermal spraying torch
23 recess portion in torch main body
23*b* side wall (discharge port periphery) of recess portion
25 front face exposed portion (end portion of external surface on side continuous with discharge port periphery)

The invention claimed is:

1. A thermal spraying torch configured to spray a molten material onto a thermal sprayed surface of a work object and form a thermal sprayed coating, comprising:
- a discharge port configured to discharge the molten material;
- a discharge port periphery located on a peripheral edge of the discharge port on a front side in a discharge direction of the molten material and extending in the discharge direction; and
- an external surface continuous with a front end of the discharge port periphery,
- wherein the discharge port periphery comprises a first section structured to have a first adherence property for the molten material higher than the external surface, wherein the external surface comprises a second section structured to have a second adherence property for the molten material lower than the discharge port periphery, wherein the first section is positioned in a direct path of the molten material discharged from the discharge port, and wherein the second section is positioned outside of the direct path of the molten material discharged from the discharge port.

2. The thermal spraying torch according to claim 1, wherein the first section of the discharge port periphery has higher surface roughness than surface roughness of the second section of the external surface.

3. The thermal spraying torch according to claim 1, wherein the second section of the external surface has lower surface roughness than surface roughness of the first section of the discharge port periphery.

4. The thermal spraying torch according to claim 1, wherein the first section of the discharge port periphery is made of a material with lower thermal conductivity than the second section of the external surface.

5. The thermal spraying torch according to claim 1, wherein the first section of the discharge port periphery is made of a material with higher affinity for the molten material than the second section of the external surface.

6. The thermal spraying torch according claim 1, wherein the second section of the external surface is made of a material with lower affinity for the molten material than the first section of the discharge port periphery.

7. The thermal spraying torch according to claim 1, wherein an end portion of the external surface on a side continuous with the discharge port periphery is a surface to which the molten material adheres more easily than to the second section of the external surface.

8. The thermal spraying torch according to claim 1, wherein the discharge port periphery includes a side wall of a recess portion that is recessed with respect to the external surface, and wherein the side wall has a tapered shape wider on the front side in the discharging direction of the discharge port.

9. The thermal spraying torch according to claim 1, comprising:

a torch main body having the discharge port; and a cover covering the torch main body and detachably attached to the torch main body, wherein the second section of the external surface is provided in the cover.

10. The thermal spraying torch according to claim 1, wherein the first section of the discharge port periphery is structured to have a higher adherence property for the molten material than the second section of the external surface.

11. A thermal spraying torch configured to spray a molten material onto a thermal sprayed surface of a work object and form a thermal sprayed coating, comprising:

a discharge port configured to discharge the molten material;

a discharge port periphery located on a peripheral edge of the discharge port on a front side in a discharge direction of the molten material and extending in the discharge direction; and an external surface continuous with a front end of the discharge port periphery, wherein the discharge port periphery comprises a first section structured to have a first adherence property for the molten material higher than the external surface, wherein the external surface comprises a second section structured to have a second adherence property for the molten material lower than the discharge port periphery, and wherein the second section of the external surface is made of a material with higher thermal conductivity than the first section of the discharge port periphery.

12. The thermal spraying torch according to claim 11, wherein the first section of the discharge port periphery is structured to have a higher adherence property for the molten material than the second section of the external surface.

13. A thermal spraying torch configured to spray a molten material onto a thermal sprayed surface of a work object and form a thermal sprayed coating, comprising:

a discharge port configured to discharge the molten material;

a discharge port periphery located on a peripheral edge of the discharge port on a front side in a discharge direction of the molten material and extending in the discharge direction; and an external surface continuous with a front end of the discharge port periphery, wherein the discharge port periphery comprises a first section structured to have a first adherence property for the molten material higher than the external surface, wherein the external surface comprises a second section structured to have a second adherence property for the molten material lower than the discharge port periphery, wherein the work object includes a circular hole and the thermal sprayed surface is an inner surface of the circular hole, wherein the thermal spraying torch is configured to discharge the molten material from the discharge port while being rotated with the thermal spraying torch inserted in the circular hole, and wherein the second section of the external surface is provided at least in a rear portion of the thermal spraying torch in a rotating direction of the thermal spraying torch.

14. The thermal spraying torch according to claim 13, wherein the first section of the discharge port periphery is structured to have a higher adherence property for the molten material than the second section of the external surface.

* * * * *